United States Patent
Li et al.

(10) Patent No.: US 11,933,614 B2
(45) Date of Patent: Mar. 19, 2024

(54) POSITIONING METHOD, POSITIONING SERVER AND POSITIONING SYSTEM

(71) Applicant: BOE TECHNOLOGY GROUP CO., LTD., Beijing (CN)

(72) Inventors: Yue Li, Beijing (CN); Jingtao Xu, Beijing (CN); Bo Xu, Beijing (CN); Zhiguo Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 889 days.

(21) Appl. No.: 16/961,719

(22) PCT Filed: Nov. 12, 2018

(86) PCT No.: PCT/CN2018/115029
§ 371 (c)(1),
(2) Date: Jul. 13, 2020

(87) PCT Pub. No.: WO2019/196403
PCT Pub. Date: Oct. 17, 2019

(65) Prior Publication Data
US 2021/0063159 A1 Mar. 4, 2021

(30) Foreign Application Priority Data

Apr. 9, 2018 (CN) .......................... 201810309986.9

(51) Int. Cl.
*G01C 21/00* (2006.01)
*B62B 3/14* (2006.01)
(Continued)

(52) U.S. Cl.
CPC .............. *G01C 21/005* (2013.01); *B62B 3/14* (2013.01); *B62B 5/00* (2013.01); *G01C 21/206* (2013.01);
(Continued)

(58) Field of Classification Search
None
See application file for complete search history.

(56) References Cited

U.S. PATENT DOCUMENTS

2008/0268876 A1 10/2008 Gelfand et al.
2013/0179075 A1* 7/2013 Haverinen .......... G01S 5/02585
701/525
(Continued)

FOREIGN PATENT DOCUMENTS

CN 102147260 A 8/2011
CN 103249142 A 8/2013
(Continued)

OTHER PUBLICATIONS

Xu et al., "Research on Multi-Source Fusion Based Seamless Indoor/Outdoor Positioning Technology", China Satellite Navigation Conference (CSNC) 2015 Proceedings, vol. III, 2015, pp. 819-838 (Year: 2015).*

(Continued)

*Primary Examiner* — Tamara L Weber
(74) *Attorney, Agent, or Firm* — The Webb Law Firm (57) ABSTRACT

The present disclosure relates to a positioning method, a positioning server, and a positioning system. The positioning method includes: receiving a wireless positioning coordinate of a moving object; determining a visual sub-map to be matched in a visual map database based on the wireless positioning coordinate; and obtaining a visual positioning coordinates corresponding to a current image of the moving object captured at time of wireless positioning as a positioning result, based on the determined visual sub-map to be matched.

20 Claims, 7 Drawing Sheets

(51) Int. Cl.
*B62B 5/00* (2006.01)
*G01C 21/20* (2006.01)
*G06F 16/29* (2019.01)
*G06F 16/587* (2019.01)
*G06Q 30/0601* (2023.01)
*G06T 7/73* (2017.01)

(52) U.S. Cl.
CPC ............ *G06F 16/29* (2019.01); *G06F 16/587* (2019.01); *G06Q 30/0639* (2013.01); *G06T 7/74* (2017.01); *G06T 2207/20021* (2013.01)

(56) References Cited

U.S. PATENT DOCUMENTS

| | | | | |
|---|---|---|---|---|
| 2016/0275667 | A1* | 9/2016 | Modica | G01S 17/06 |
| 2017/0225336 | A1* | 8/2017 | Deyle | B25J 5/007 |
| 2018/0025500 | A1* | 1/2018 | Nielsen | G06V 20/52 |
| | | | | 382/103 |
| 2018/0066945 | A1* | 3/2018 | Meier | G05D 1/0231 |
| 2018/0283882 | A1* | 10/2018 | He | H04L 67/30 |
| 2019/0156513 | A1* | 5/2019 | McNeally | G01C 21/16 |

FOREIGN PATENT DOCUMENTS

| | | |
|---|---|---|
| CN | 103596263 A | 2/2014 |
| CN | 104936283 A | 9/2015 |
| CN | 106291517 A | 1/2017 |
| CN | 106793086 A | 5/2017 |
| CN | 107167130 A | 9/2017 |
| CN | 107392964 A | 11/2017 |
| CN | 107677279 A | 2/2018 |
| CN | 108692720 A | 10/2018 |
| WO | 2009014332 A2 | 1/2009 |
| WO | 2012024516 A2 | 2/2012 |

OTHER PUBLICATIONS

Wu et al., "Visual Positioning Indoors: Human Eyes vs. Smartphone Cameras", Sensors, Nov. 16, 2017, pp. 1-16 (Year: 2017).*
Sherwin et al., "A Single RF Emitter-Based Indoor Navigation Method for Autonomous Service Robots", Sensors, Feb. 14, 2018, pp. 1-22 (Year: 2018).*

* cited by examiner

POSITIONING METHOD, POSITIONING SERVER AND POSITIONING SYSTEM

CROSS-REFERENCE TO RELATED APPLICATIONS

This application is the United States national phase of International Application No. PCT/CN2018/115029 filed Nov. 12, 2018, and claims priority to Chinese Patent Application No. 201810309986.9 filed Apr. 9, 2018, the disclosures of which are hereby incorporated by reference in their entirety.

TECHNICAL FIELD

The present disclosure relates to a positioning method, a positioning server and a positioning system.

BACKGROUND

In people's daily lives, shopping in malls and supermarkets is a main shopping means of people. Such shopping means is very intuitive and convenient, but there are still some shortcomings. For example, due to an increasing scale of malls and supermarkets, it is not easy for consumers to find products intended to be purchased during shopping in malls or supermarkets.

In the related art, a plurality of positioning technologies applied to indoor scenarios, such as wireless positioning technology or visual positioning technology, have emerged.

SUMMARY

In one aspect of the present disclosure, a positioning method is provided. The method includes: receiving a wireless positioning coordinate of a moving object; determining a visual sub-map to be matched in a visual map database based on the wireless positioning coordinate; and obtaining a visual positioning coordinate corresponding to a current image of the moving object captured at time of wireless positioning as a positioning result, based on the determined visual sub-map to be matched.

In some embodiments, selecting the visual sub-map to be matched includes: determining at least one of a visual sub-map where the wireless positioning coordinate is located and an adjacent visual sub-map, as the visual sub-map to be matched.

In some embodiments, determining the visual sub-map to be matched includes: drawing a geometric pattern with the wireless positioning coordinate as a reference point based on a system error of the wireless positioning coordinate, and determining a plurality of visual sub-maps pre-stored in the visual map database which are entirely or partly covered by the geometric pattern, as the visual sub-map to be matched.

In some embodiments, obtaining the visual positioning coordinate includes: determining a matching key frame in the visual sub-map to be matched that matches the current image; and performing an iterative pose estimation on the current image and the matching key frame to obtain the visual positioning coordinate corresponding to the current image.

In some embodiments, determining a matching key frames includes: performing a feature extraction on the current image and obtaining corresponding visual words; searching a candidate matching frame in key frames of the visual sub-map to be matched, wherein a matching score between at least one visual word of the candidate matching frame and visual words of the current image is greater than a first threshold; counting an amount of visual words of each candidate matching frame, wherein a matching score between the visual words and the visual words of the current image is greater than a second threshold, and selecting a candidate matching frame with an amount greater than a third threshold as a common-view frame; making each common-view frame and a preset number of key frames before or after the common-view frame into a group, and calculating an accumulative score of matching degree between visual words of all key frames in each group and the visual words of the current image; and referring a key frame with the highest matching score in a group with the accumulative score of matching degree greater than a fourth threshold as the matching key frame.

In some embodiments, the positioning method further includes a step of constructing a visual map database, which includes: registering coordinate systems of a wireless positioning process and a visual positioning process; dividing a positioning coverage area into a plurality of visual sub-maps, and collecting sparse three-dimensional map feature points and visual words of a plurality of key frames within a range of each visual sub-map; and saving the plurality of key frames corresponding to respective visual sub-maps, the sparse three-dimensional map feature points and the visual words to the visual map database.

In some embodiments, the positioning method further includes: predicting a visual sub-map to be entered by the moving object based on the visual positioning coordinate and a direction of the moving object when it is determined that the moving object is in a boundary area of a visual sub-map at a current moment based on the visual positioning coordinate; and determining the predicted visual sub-map as the visual sub-map to be matched, and performing an operation of obtaining a visual positioning coordinate corresponding to a next image.

In some embodiments, predicting a visual sub-map includes: determining a straight line passing through the visual positioning coordinate and having the same direction as the moving object based on the visual positioning coordinate and a direction of the moving object; and when there is an intersection between the straight line and a boundary of an adjacent visual sub-map of a visual sub-map at the current moment, and a distance between the visual positioning coordinate and the boundary is shorter than a distance between the visual positioning coordinate and other boundaries of the visual sub-map at the current moment, predicting that the adjacent visual sub-map is the visual sub-map to be entered by the moving object.

In some embodiments, the positioning method further includes: determining a projection point of the wireless positioning coordinate on a preset path as a positioning result, based on a planar environment map of a positioning coverage area.

In some embodiments, determining a projection point includes: determining whether a navigation path has been generated within the planar environment map; if so, projecting the wireless positioning coordinate onto the navigation path, and if not, projecting the wireless positioning coordinate onto an accessible path in the planar environment map.

In some embodiments, the positioning method further includes: when the wireless positioning coordinate is projected onto the navigation path, determining whether the shortest distance of projecting the wireless positioning coordinate onto the navigation path is greater than an absolute value of a system error of the wireless positioning coordinate; if so, projecting the wireless positioning coordinate onto the accessible path, and if not, using a projection point corresponding to the shortest distance as a positioning result.

In some embodiments, an operation of projecting the wireless positioning coordinates onto the accessible path includes: determining an accessible path in the planar environment map with the smallest included angle relative to a direction of the moving object and at the closest distance to the wireless positioning coordinate; and taking a projection point of projecting the wireless positioning coordinate onto the accessible path which has been determined as a positioning result.

According to another aspect of the present disclosure, a positioning server is provided. The positioning server includes: a memory; and a processor coupled to the memory, wherein the processor is configured to perform the foregoing positioning method based on instructions stored in the memory.

According to still another aspect of the present disclosure, a positioning system is provided. The positioning system includes: the foregoing positioning server; and a moving object moving in a positioning coverage area, and configured to perform wireless communication with the positioning server.

In some embodiments, the positioning system further including a user interaction unit configured to send and receive positioning messages, which communicates with the positioning server.

In some embodiments, the moving object comprising a shopping cart, and the user interaction unit comprises a mobile phone of user.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. Such similar words as "comprising" or "containing" mean that the element preceding the word encompasses the elements enumerated after the word, and does not exclude the possibility of encompassing other elements as well. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

In some related arts, a plurality of positioning technologies applied to indoor scenarios have emerged, such as wireless positioning technology or visual positioning technology. For wireless positioning technology, its amount of data processed is relatively less, and the requirements for the computing capacity are relatively low. However, its positioning accuracy is relatively poor, so that it is difficult to meet the positioning needs in some indoor environments (such as shops or supermarkets).

For visual positioning technology, its positioning accuracy is relatively high, but the amount of data required to be processed is relatively more, and the requirements for the computing capacity are relatively high. Therefore, when visual positioning is performed in a wide venue (such as a large supermarket), the data of the offline visual map for visual positioning often reaches as high as at least some gigabytes, which causes that the computing platform that performs visual positioning needs to have a very high computing capacity. Even so, it is also not likely to achieve the real-time positioning effect. In addition, when an offline visual map of a wide venue is constructed, it is likely to produce substantial cumulative visual errors, thereby seriously affecting the online positioning accuracy.

In view of this, the present disclosure provides a positioning method, a positioning server and a positioning system to overcome the defects of these two technologies by organic integration of wireless positioning technology and visual positioning technology, and improve the positioning accuracy and efficiency to meet the positioning requirements of a wide venue.

Figure 1:
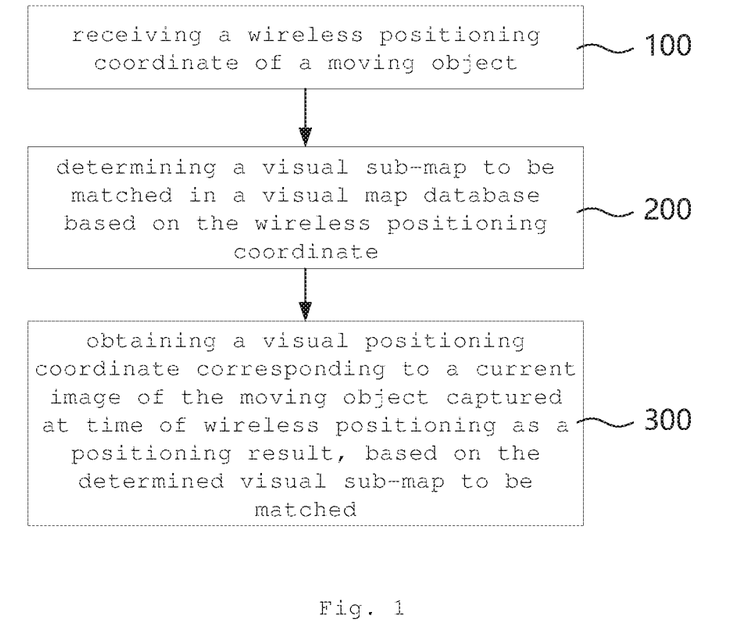
FIG. 1 is a schematic flowchart of some embodiments of the positioning method according to the present disclosure.

FIG. 1 is a schematic flowchart of some embodiments of the positioning method according to the present disclosure.

In FIG. 1, the positioning method includes:

Step 100: a wireless positioning coordinate of a moving object is received.

Step 200: a visual sub-map to be matched in a visual map database is determined based on the wireless positioning coordinate.

Step 300: a visual positioning coordinate corresponding to a current image of the moving object captured at time of wireless positioning is obtained as a positioning result, based on the determined visual sub-map to be matched.

In these embodiments, the moving object may move within a preset positioning coverage area. The moving object here may include an object driven by human power or moving as human's move, such as a trolley, a bicycle, a skateboard, a shopping basket or an augmented reality helmet, and may also include an object that can move spontaneously, such as a walking robot and an unmanned vehicle or a drone.

The positioning coverage area refers to an area covered by a positioning range realized by the positioning method of the present disclosure, also that is, a moving area of the moving object. The positioning coverage area includes an indoor venue or an open-air venue, such as shop, supermarket, office building, enclosed gymnasium, or open-air stadium.

In the present embodiments, the visual sub-map to be matched is selected based on the wireless positioning coordinate, and the visual positioning coordinate is determined as a positioning result in the selected visual sub-map to be matched. The amount of map data involved during the visual positioning process is reduced by the wireless positioning coordinate, thereby improving the efficiency and accuracy of the visual positioning process, and thus meeting the positioning requirements of a wide venue.

In step 100, the wireless positioning coordinate of the moving object may be received by a server. The wireless positioning coordinate may be obtained by a wireless positioning unit provided on the moving object, or by a server or a third-party device. The wireless positioning method may use various known wireless positioning algorithms based on WiFi, infrared, Bluetooth, and Zigbee.

In some embodiments, a plurality of Bluetooth beacon nodes are firstly deployed at preset intervals (for example, 3-5 meters) in a positioning coverage area where positioning is required. The positioning unit provided on the moving object may receive Bluetooth signals from surrounding Bluetooth beacon nodes and sort the signals according to the intensity. Then, the top three Bluetooth beacon nodes with the strongest intensities are screened. The coordinates of the three Bluetooth beacon nodes are $(x_1,y_1)$, $(x_2,y_2)$ and $(x_3,y_3)$ respectively, and the distance values corresponding to the moving object are $d_1$, $d_2$ and $d_3$ respectively. Next, based on the following example of a calculation formula of three-point weighted centroid algorithm, the wireless positioning coordinate $(x_b,y_b)$ may be calculated:

$$x_b = \frac{\frac{x_1}{d_1} + \frac{x_2}{d_2} + \frac{x_3}{d_3}}{\frac{1}{d_1} + \frac{1}{d_2} + \frac{1}{d_3}},$$

$$y_b = \frac{\frac{y_1}{d_1} + \frac{y_2}{d_2} + \frac{y_3}{d_3}}{\frac{1}{d_1} + \frac{1}{d_2} + \frac{1}{d_3}}$$

As mentioned earlier, since the amount of data required to be processed by wireless positioning technology is less, the wireless positioning unit may obtain the wireless positioning coordinate in a short time and send them to the server. After receiving the wireless positioning coordinate, the server may select a visual sub-map to be matched in the visual map database based on the wireless positioning coordinate.

In the related art, the visual positioning technology needs to construct an overall visual map database based on the positioning coverage area. In these embodiments, a plurality of visual sub-maps are stored in the visual map database. These visual sub-maps are obtained by dividing the positioning coverage area. The data amount corresponding to each visual sub-map is relatively less.

The wireless positioning coordinate received by the server may serve as a basis for determining which visual sub-maps to participate in the visual positioning process as the visual sub-maps to be matched. In other words, the amount of map data required for visual positioning is reduced using the wireless positioning coordinate that has been determined. The following shows examples of three types of feasible selection of visual sub-maps to be matched by way of FIGS. 2 to 4 respectively.

Figure 2:
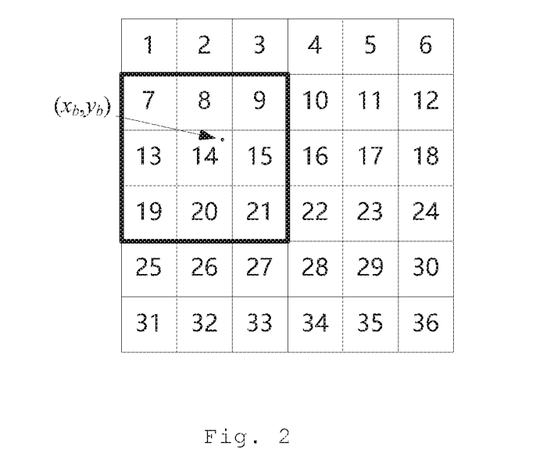
FIG. 2 is a schematic view of selecting a visual sub-map to be matched in some embodiments of the positioning method according to the present disclosure.

FIG. 2 is a schematic view of selecting a visual sub-map to be matched in some embodiments of the positioning method according to the present disclosure.

Referring to FIG. 2, in some embodiments, a plurality of visual sub-maps are pre-stored in the visual map database. These visual sub-maps are divided into squares and numbered sequentially. The 36 visual sub-maps shown in FIG. 2 may be a part of the visual map database, or all visual sub-maps corresponding to the entire positioning coverage area. When the wireless positioning coordinate $(x_b, y_b)$ is determined, the serial number 14 of the visual sub-map where the wireless positioning coordinate is located may be determined correspondingly, and the serial numbers 7, 8, 9, 13, 15, 19, 20, and 21 of the visual sub-maps adjacent to the visual sub-map may be determined based on the serial number 14.

According to factors such as the accuracy requirements of visual positioning or the system error degree of wireless positioning, only the visual sub-map where the wireless positioning coordinate is located may be selected as a visual sub-map to be matched, or any one or all of other visual sub-maps adjacent to of the visual sub-map where the wireless positioning coordinate may be selected as visual sub-maps to be matched. Obviously, the data amount of the selected visual sub-maps to be matched is much less than that of all visual sub-maps. Therefore, the requirements for the computing capacity are reduced, so that the efficiency of visual positioning is improved, and the real-time performance of visual positioning is enhanced.

In addition to a manner of selecting adjacent visual sub-maps, in other embodiments, the wireless positioning coordinate may also serve as a reference point to draw a geometric pattern according to a system error of the wireless positioning coordinate. Then, visual sub-maps that are entirely or partially covered by the geometric pattern among a plurality of visual sub-maps pre-stored in the visual map database are selected as visual sub-maps to be matched.

Figure 3:
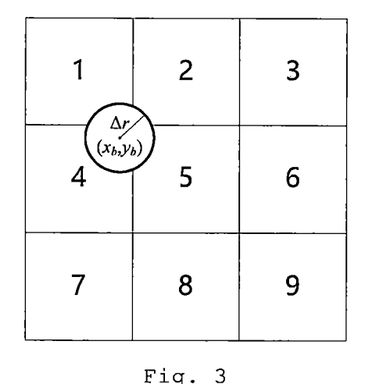
FIG. 3 is a schematic view of selecting a visual sub-map to be matched in other embodiments of the positioning method according to the present disclosure.

FIG. 3 is a schematic view of selecting a visual sub-map to be matched in other embodiments of the positioning method according to the present disclosure.

Referring to FIG. 3, in some embodiments, after the wireless positioning coordinate $(x_b, y_b)$ is received, a circle may be drawn with the wireless positioning coordinate as the center of circle, and with the absolute value of the system error of the wireless positioning coordinate as the radius Ar. It may be seen from FIG. 3 that the circle covers part of the visual sub-maps with the serial numbers 1, 2, 4, and 5, so that the four visual sub-maps serve as visual sub-maps to be matched. In addition to selecting a circular shape as a drawn geometric pattern, a rectangular, triangular, elliptical, or irregular shape may also be selected as a geometric pattern based on the wireless positioning coordinate. The size of the geometric pattern may be determined with reference to the system error of the wireless positioning coordinate or other factors.

Figure 4:
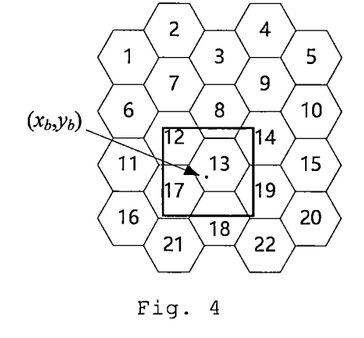
FIG. 4 is a schematic view of selecting a visual sub-map to be matched in still other embodiments of the positioning method according to the present disclosure.

FIG. 4 is a schematic view of selecting a visual sub-map to be matched in still other embodiments of the positioning method according to the present disclosure.

Referring to FIG. 4, the positioning coverage area is divided into a plurality of regular hexagons adjacent to each other, respectively corresponding to visual sub-maps with different serial numbers. After the wireless positioning coordinate $(x_b, y_b)$ are determined, a square is drawn according to the system error of the wireless positioning coordinate. The square covers a part of the visual sub-maps with the serial numbers 8, 12, 14, 17, 18, 19, and an entirety of the visual sub-map with the serial numbers 13. Thus, these visual sub-maps are further determined as visual sub-maps to be matched.

Figure 5:
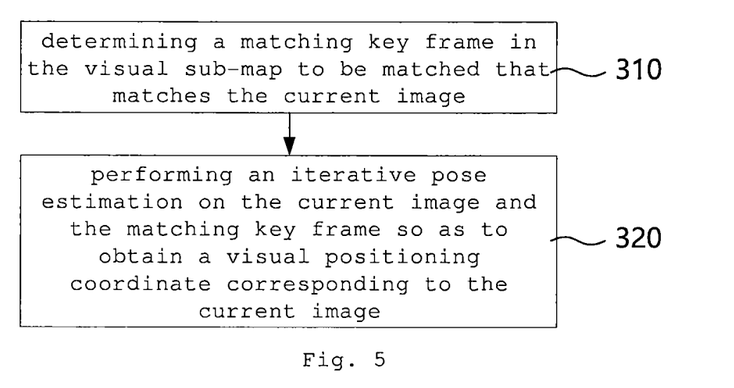
FIG. 5 is a schematic flowchart of obtaining visual positioning coordinate in some embodiments of the positioning method according to the present disclosure.

FIG. 5 is a schematic flowchart of obtaining visual positioning coordinate in some embodiments of the positioning method according to the present disclosure.

Referring to FIG. 5, in some embodiments, the step 300 may specifically include:

Step 310: a matching key frame in the visual sub-map to be matched that matches the current image is determined.

Step 320: an iterative pose estimation on the current image and the matching key frame is performed so as to obtain the visual positioning coordinate corresponding to the current image.

In step 310, the matching key frame is a key frame in map data of the visual sub-map to be matched, and the degree of correlation between the current image and the key frame is closer than that between the current image and other key frames. Since the amount of map data of the visual sub-map to be matched is relatively less, the computing capacity consumed to determine the matching key frame is relatively less, and the processing efficiency is correspondingly improved.

The current image here refers to an image captured in the vicinity of the moving object at a current moment when the wireless positioning coordinate of the moving object is obtained. For example, a camera unit is provided on a front side of the moving object, and a scenario in front of the moving object is captured. In order to improve the accuracy of visual positioning, the image captured at a certain moment may be made to correspond to the wireless positioning coordinate obtained at this moment.

In order to achieve the matching between the current image and the key frame in each visual sub-map to be matched, it is possible to use a manner of extracting visual words from the image and calculating a matching degree between the visual words of the current image and the visual words of the key frame. In some embodiments, the key frame that contains the largest number of visual words with a matching score to a certain degree may be directly used as the matching key frame. Considering factors such as the system errors and noises, in order to improve the robustness of visual positioning, the implementation steps of determining the matching key frame in FIG. 6 may also be taken.

Figure 6:
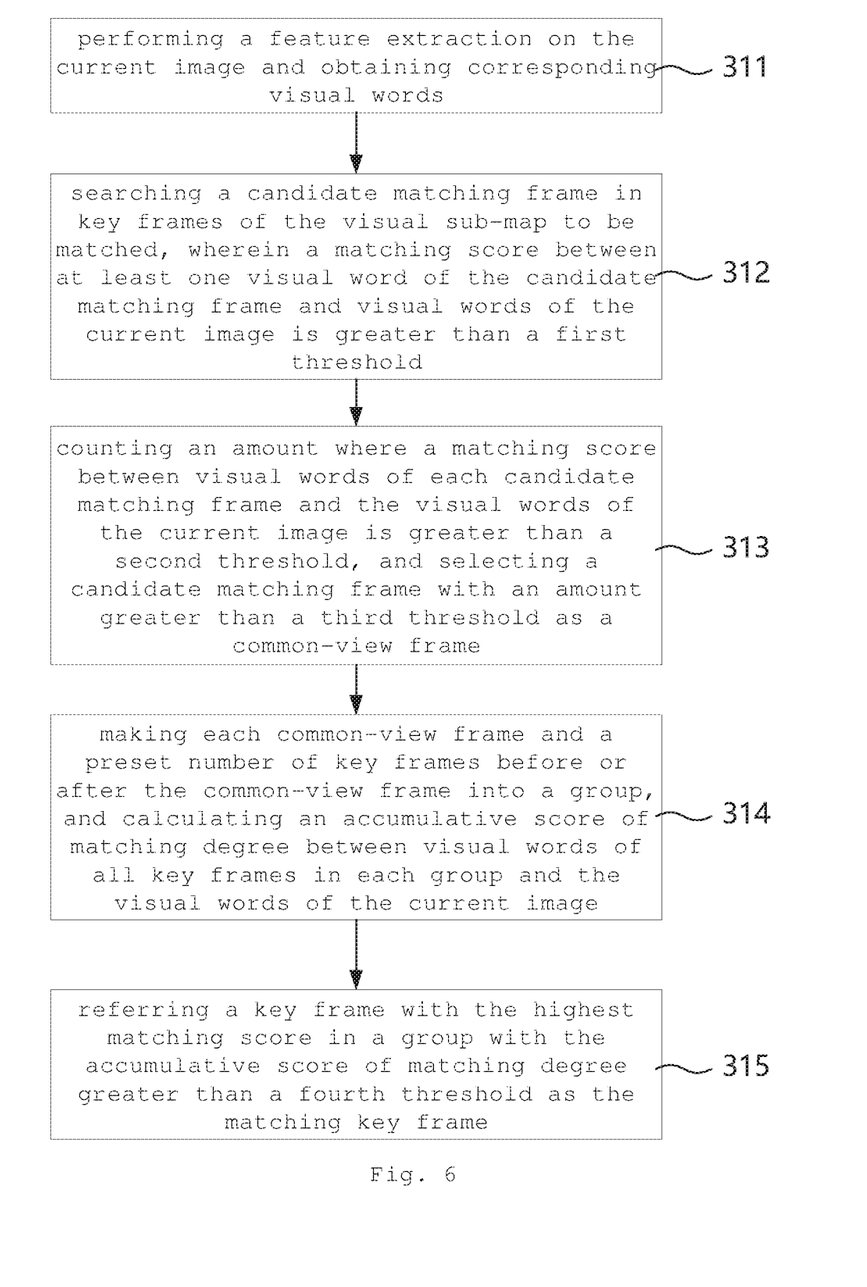
FIG. 6 is a schematic flowchart of determining a matching key frame in some embodiments of the positioning method according to the present disclosure.

FIG. 6 is a schematic flowchart of determining a matching key frame in some embodiments of the positioning method according to the present disclosure.

In FIG. 6, the step 310 may specifically include steps 311-315. In Step 311, a feature extraction is performed on the current image, and corresponding visual words are obtained. In the present embodiments, the visual words in the current image are multi-dimensional vectors formed after extracting the graphic features in the current image.

In order to determine a matching key frame, the step 312 may be performed, that is, searching for a candidate matching frame in key frames of the visual sub-map to be matched, wherein the matching degree between at least one visual word of the candidate matching frame and the visual words of the current image is greater than the first threshold. By setting the first threshold, some key frames may be selected from the visual sub-map to be matched as candidate matching frames. These selected key frames contain visual words that are relatively similar to the visual words of the current image.

After the candidate matching frames are determined, the common-view frames may be further determined by determining an amount of similar visual words contained in each candidate matching frame. Specifically, reference may be made to step 313, that is, counting an amount where a matching degree between the visual words of the each candidate matching frames and the visual words of the current image is greater than the second threshold, and select the candidate matching frames with an amount greater than the third threshold as common-view frames. In other words, if the visual words contained in certain candidate matching frames are relatively similar to the visual words in the current image, and the amount of similar visual words in the candidate matching frames exceeds a set threshold, these candidate matching frames serve as common-view frames.

The value of the second threshold may be the same as the value of the first threshold, or higher than the value of the first threshold, so as to improve the standard of a matching degree of the visual words, and reduce the amount of key frames that meet the conditions of the common-view frames, thereby reducing the amount of calculation.

In some embodiments, the common-view frame with the largest number of similar visual words in the candidate matching frame may be directly used as the matching key frame. In other embodiments, if the interference of factors such as the system errors or image noises causes the circumstance that there is an excessive gap between the amount of similar visual words in a single common-view frame and the amount of similar visual words in adjacent key frames, it is indicated that the matching key frame is not appropriately determined.

In order to overcome the influence of interference, the following steps may be taken:

Step 314: each common-view frame and a preset number of key frames before or after the common-view frame is made into a group, and an accumulative score of matching degree between the visual words of all key frames in each group and the visual words of the current image is calculated.

Step 315: the key frame with the highest matching score in the group with the accumulative score of matching degree greater than the fourth threshold serves as the matching key frame.

By calculating the accumulative score of the matching degree after grouping the common-view frames and adjacent key frames, and then determining the matching key frame according to the accumulative score of the matching degree, it is possible to eliminate the adverse effects caused by interference, and improve the robustness and accuracy of visual positioning.

Still referring to FIG. 5, in some embodiments, after the matching key frame is determined, iterative post estimation on the current image and the matching key frame in step 320 may be performed so as to obtain the visual positioning coordinate $(x_c, y_c)$ corresponding to the current image.

Here, the existing algorithms, such as EPnP algorithm, sequential orthogonal iterative algorithm, or Levenberg-Marquardt algorithm may be used for iterative pose estimation. The specific content of the algorithms will not be described in detail here. By iterative pose estimation, it is possible to obtain the coordinate conversion matrix of the current image relative to the world coordinate system, and further determine the position coordinate of the current image as the visual positioning coordinate.

The data in the visual map database that is offline or may be updated online is used when a matching visual sub-map is selected. The visual map database may be stored on the server. For its construction process, reference may be made to the embodiments shown in FIG. 7.

Figure 7:
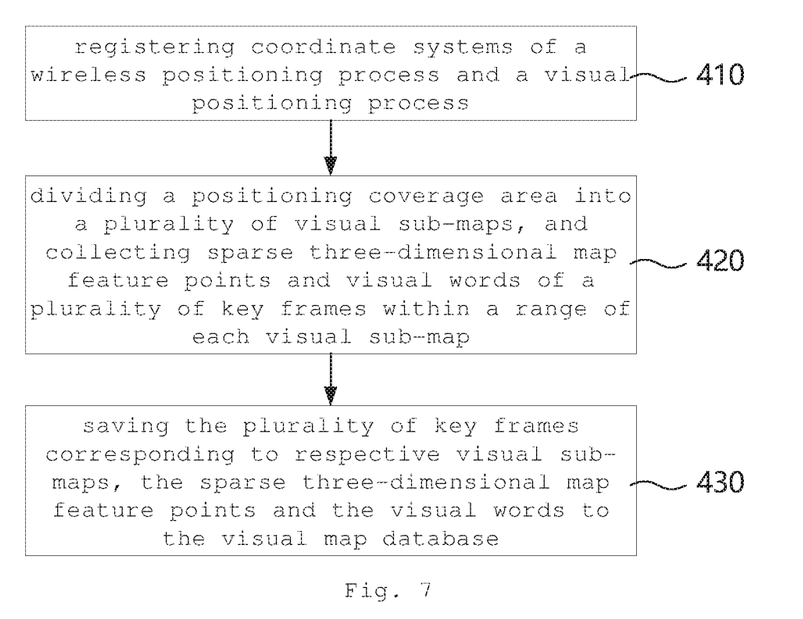
FIG. 7 is a schematic flowchart of constructing a visual map database in some embodiments of the positioning method according to the present disclosure.

FIG. 7 is a schematic flowchart of constructing a visual map database in some embodiments of the positioning method according to the present disclosure.

In FIG. 7, the method of constructing a visual map database includes steps 410-430. In step 410, the coordinate system of the wireless positioning process and the coordinate system of the visual positioning process are registered. In other words, by way of a registration operation, the coordinate system on which the wireless positioning process is based and the coordinate system on which the visual positioning process is based are the same world coordinate system, so as to eliminate positioning errors caused by inconsistent coordinate systems.

Next, in step 420, the positioning coverage area is divided into a plurality of visual sub-maps, and sparse three-dimensional map feature points and visual words of a plurality of key frames are collected within a range of each visual sub-map. For example, referring to FIG. 2, the area range of 10 meters×10 meters is used as a one visual sub-map, and then the entire positioning coverage area is divided into a plurality of adjacent visual sub-maps. Alternatively, referring to FIG. 4, the entire positioning coverage area is divided according to a regular hexagon of a set size as one visual sub-map.

For example, within each visual sub-map, the data corresponding to a visual sub-map is constructed based on the VSLAM algorithm for sparse feature matching respectively. The process specifically includes: capturing a plurality of key frames at different positions and different angles of each sub-area by a camera; extracting sparse three-dimensional map feature points in the key frames by VSLAM algorithm; and obtaining visual words by extracting the features of the key frames. Then, in step 430, the plurality of key frames corresponding to each visual sub-map, the sparse three-dimensional map feature points, and the visual words are saved to the visual map database.

After the current visual positioning coordinate is determined based on the current wireless positioning coordinate, the visual positioning coordinate at the next moment may be directly used for visual positioning at the next moment based on the visual sub-map corresponding to the current visual positioning coordinate. If the moving object is about to move to another visual sub-map soon, in order to improve the real-time performance, the visual sub-map may be predicted before the moving object enters another visual sub-map.

Figure 8:
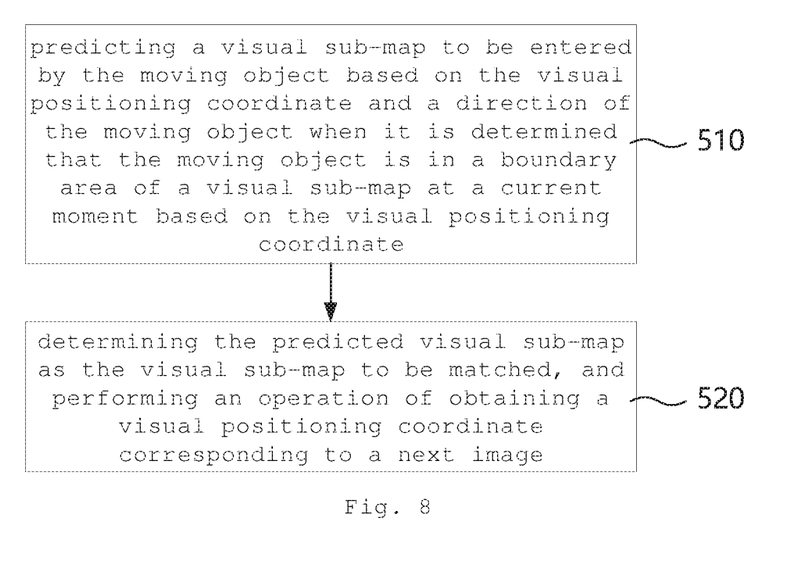
FIG. 8 is a schematic flowchart of predicting a visual sub-map to be entered in a boundary area in some embodiments of the positioning method according to the present disclosure.

FIG. 8 is a schematic flowchart of predicting a visual sub-map to be entered in a boundary area in some embodiments of the positioning method according to the present disclosure.

Referring to FIG. 8, in some embodiments, the positioning method further includes:

Step 510: when it is determined that the moving object is in a boundary area of the visual sub-map at the current moment based on the visual positioning coordinate, a visual sub-map to be entered by the moving object is predicted based on the visual positioning coordinate and a direction of the moving object;

Step 520: the predicted visual sub-map is determined as the visual sub-map to be matched, and an operation of obtaining a visual positioning coordinate corresponding to the next image is performed.

In the present embodiments, by predicting a visual sub-map to be entered by the moving object and loading data as the visual sub-map to be matched, it is possible to not only reduce the data amount required for visual positioning, but also improve the real-time performance of visual positioning.

In step 510, the boundary area may be set in advance, for example, it is set as an area within the visual sub-map at a predetermined distance (for example, 1 to 2 meters) close to a boundary. Since the boundary of the visual sub-map has been determined in advance, when the current visual positioning coordinate is determined, it may be calculated whether the current visual positioning coordinate is in the boundary area.

When the visual sub-map is predicted, a straight line passing through the visual positioning coordinate and having the same direction as the moving object may be determined based on the visual positioning coordinate and the direction of the moving object (that is, an arrow direction). If there is an intersection between the straight line and the boundary of an adjacent visual sub-map of the visual sub-map at the current moment, and the distance between the visual positioning coordinate and the boundary is shorter than the distance of between the visual positioning coordinate and other boundaries of the visual sub-map at the current moment, it is predicted that the adjacent visual sub-map is a visual sub-map to be entered by the moving object.

The direction of the moving object may be measured by a direction finding unit provided on the moving object. According to a movement mode of the moving object, the direction may include a direction of the moving object itself, such as a heading direction of the trolley; and may also include a moving direction of the moving object, such as a moving direction of the robot. Correspondingly, a suitable direction finding unit is selected according to the type of direction, such as a magnetometer and a direction sensor.

Figure 9:
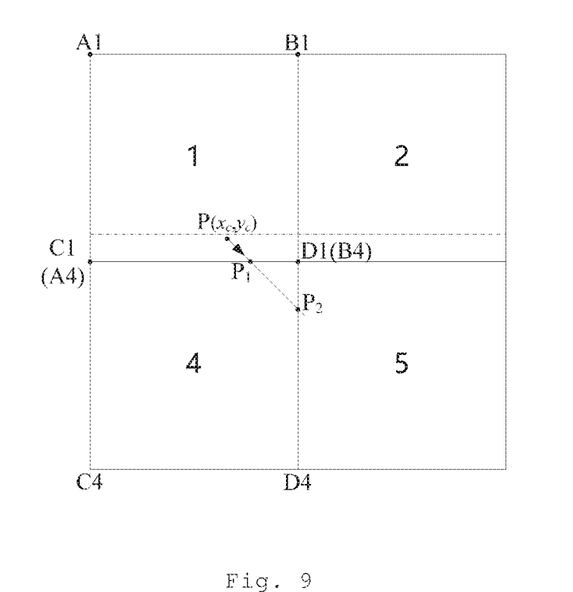
FIG. 9 is a schematic view of predicting a visual sub-map in some embodiments of the positioning method according to the present disclosure.

FIG. 9 is a schematic view of predicting a visual sub-map in some embodiments of the positioning method according to the present disclosure.

In FIG. 9, the point $P(x_c, y_c)$ is located on the visual sub-map with the serial number 1. A straight line may be drawn from the point $P(x_c, y_c)$ along a direction of the moving object (that is, an arrow direction). The straight line intersects with the boundaries C1D1 and D1D4 of an adjacent visual sub-map with the serial number 4 respectively, and the intersection points are P1 and P2 respectively. Since the distance from $P(x_c, y_c)$ to the boundary C1D1 of an adjacent visual sub-map with the serial numbers 4 is the shortest, it is predicted that the adjacent visual sub-map is a visual sub-map to be entered by the moving object.

When the surrounding environment where the moving object is located significantly affects the visual positioning process, for example, there is an interfering object that blocks a camera unit, or the surrounding environment suddenly changes a lot, the visual positioning coordinate may not be obtained. In order to maintain the continuity of the positioning service, in some embodiments, the wireless positioning technology is combined with a known planar environment map to perform positioning. That is, the positioning method may further include: determining a projection point of the wireless positioning coordinate on a preset path as a positioning result based on a planar environment map of the positioning coverage area. The positioning process may be performed when the visual positioning fails, or may also be performed in other situations, for example, when a map positioning instruction issued by the user is received.

A planar environment map of the positioning coverage area may be drawn in advance, and an accessible path within the planar environment map is formulated in advance so as to obtain a more accurate positioning result. When a projection point is determined, judgment may be made according to whether a navigation path has been generated in the planar environment map. If a navigation path has been generated, the wireless positioning coordinate may be projected onto the navigation path. If no navigation path is generated, the wireless positioning coordinate is projected onto an accessible path in the planar environment map.

Figure 10:
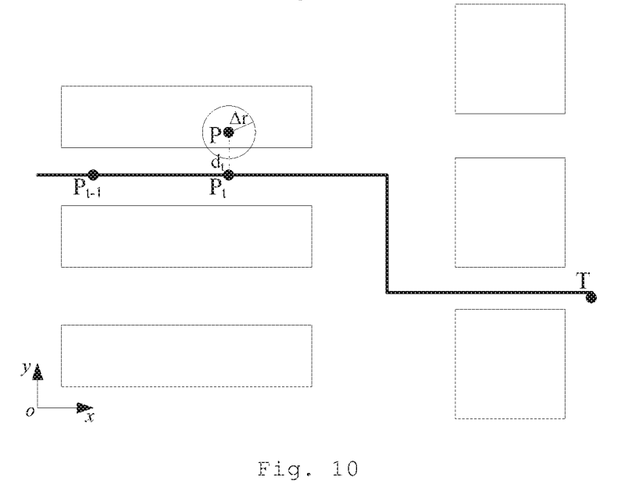
FIG. 10 is a schematic view of determining a projection point in some embodiments of the positioning method according to the present disclosure.

FIG. 10 is a schematic view of determining a projection point in some embodiments of the positioning method according to the present disclosure.

In FIG. 10, a navigation path from $P_{t-1}$ to a target point T has been generated before the moment t−1. At this time, since a navigation path has been generated, the wireless positioning coordinate P received in step 100 may be projected onto the navigation path to obtain a projection point $P_t$. The projection point $P_t$ may serve as a positioning result.

Considering that there is often a certain system error during the wireless positioning process, in other embodiments, when the wireless positioning coordinate is projected onto the navigation path, there may further include a step of determining whether the shortest distance $d_t$ of projecting the wireless positioning coordinate onto the navigation path is greater than the absolute value Δr of the system error of the wireless positioning coordinate. If the shortest distance $d_t$ is greater than the absolute value Δr, the wireless positioning coordinate is projected onto the accessible path in the planar environment map. If the shortest distance $d_t$ is less than or equal to the absolute value Δr, the projection point $P_t$ corresponding to the shortest distance is used as a positioning result.

In some embodiments, the operation of projecting the wireless positioning coordinate onto the accessible path in the planar environment map may specifically include: determining an accessible path in the planar environment map with the smallest included angle relative to a direction of the moving object and at the closest distance to the wireless positioning coordinate, and taking a projection point of projecting the wireless positioning coordinate onto the accessible point which has been determined as a positioning result.

Figure 11:
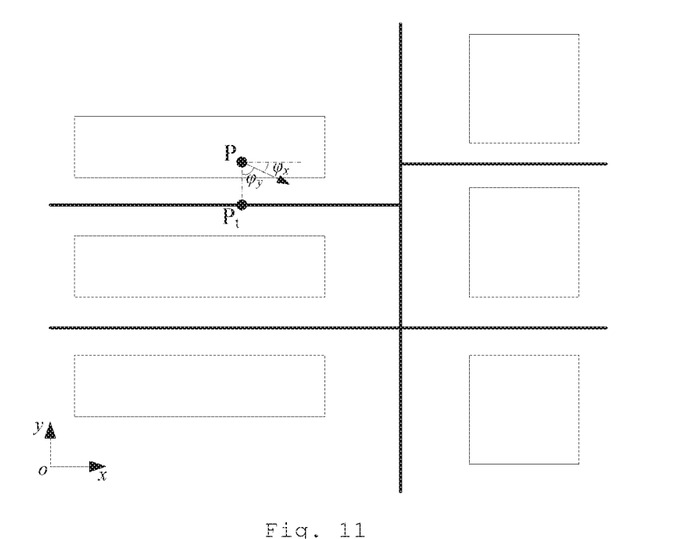
FIG. 11 is a schematic view of determining a projection point in other embodiments of the positioning method according to the present disclosure.

FIG. 11 is a schematic view of determining a projection point in other embodiments of the positioning method according to the present disclosure.

Referring to FIG. 11, the accessible paths along the x-axis direction and the y-axis direction have been drawn in the planar environment map. In other embodiments, the accessible paths are not limited to include a straight line segment parallel to an orthogonal coordinate axis, but may also be a fold line or a curve with an obtuse or acute angle.

After the wireless positioning coordinate P is received from step 100, according to a direction of the moving object, included angles between the direction and the accessible paths along the x-axis direction and the y-axis direction may be determined to be $\phi_x$ and $\phi_y$ respectively, and $\phi_x < \phi_y$. In addition, the distance from the point P to the closest accessible path along the x-axis direction below is the shortest. Therefore, the point P is projected onto the accessible path, and the projection point $P_t$ is obtained as a positioning result.

Figure 12:
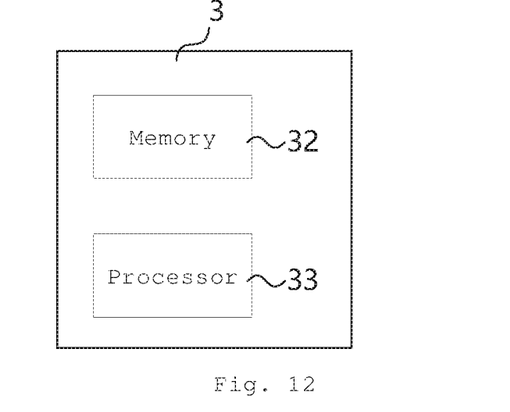
FIG. 12 is a block schematic view of some embodiments of the positioning server according to the present disclosure.

FIG. 12 is a block schematic view of some embodiments of the positioning server according to the present disclosure.

Referring to FIG. 12, in some embodiments, the positioning server 3 may include a memory and a processor coupled to the memory, wherein the processor configured to perform any one of the foregoing positioning method embodiments based on instructions stored in the memory.

Figure 13:
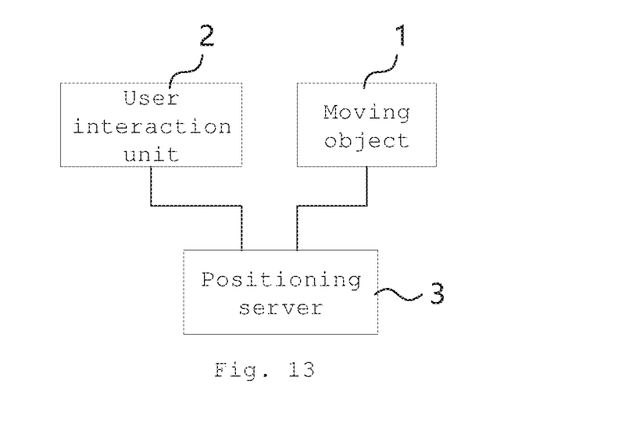
FIG. 13 is a block schematic view of some embodiments of the positioning system according to the present disclosure.

FIG. 13 is a block schematic view of some embodiments of the positioning system according to the present disclosure.

In some embodiments shown in FIG. 13, the positioning system includes a moving object 1 and the foregoing positioning server 3. The moving object 1 can move in the positioning coverage area. Referring to FIG. 13, in some embodiments, the positioning system may further include a user interaction unit 2. The user interaction unit 2 communicates with the positioning server for sending and receiving the positioning messages. The user interaction unit 2 may include a user's own mobile terminal or a fixed terminal provided on the moving object. The unit may communicate with the positioning server 3 according to a preset program or according to user instructions, so as to send a positioning request and receive a positioning result returned by the positioning server. The user interaction unit 2 may be mounted on the moving object or carried by a user. In another embodiment, the user interaction unit 2 may also be relatively fixedly disposed at a specific position, such as a computer room and a monitoring room.

Figure 14:
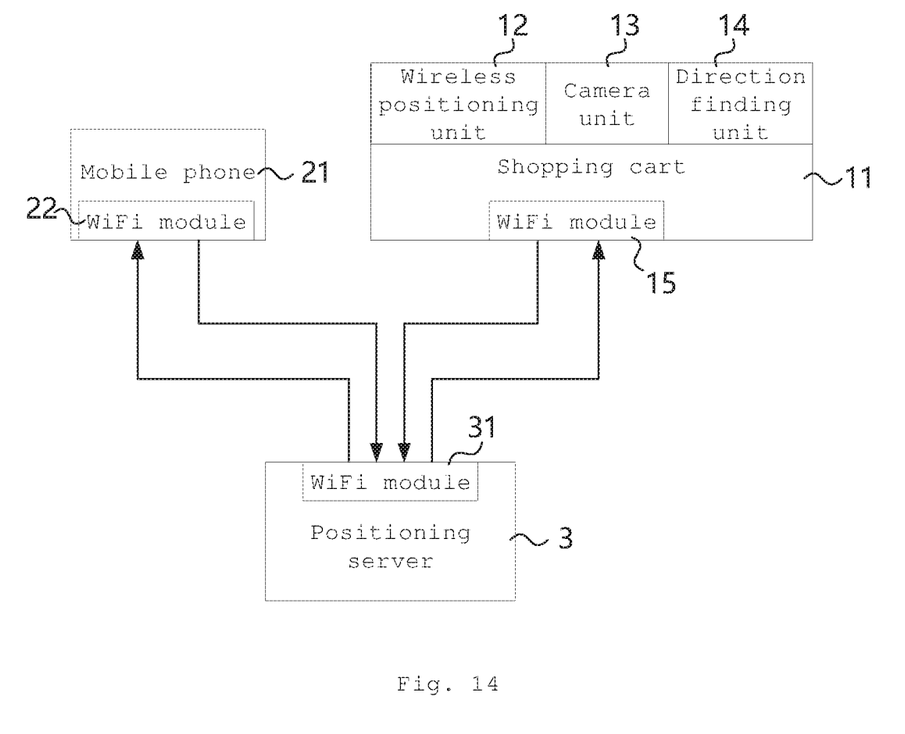
FIG. 14 is a block schematic view of other embodiments of the positioning system according to the present disclosure.

FIG. 14 is a block schematic view of other embodiments of the positioning system according to the present disclosure.

FIG. 14 shows an example of a business scenario where a user is shopping in a large mall or supermarket. The mobile phone 21 of the user performs wireless communication with the positioning server 3 as the user interaction unit 2. The shopping cart 11 also performs wireless communication with the positioning server 3 as the moving object 1. The mobile phone 21 realizes wireless communication connection with a WiFi module 31 provided in the positioning server 3 through own WiFi module 22 and the shopping cart 11 also realizes wireless communication connection with the WiFi module 31 through a WiFi module 15 provided on the shopping cart 11.

In order to reduce the computing and communication burden of the mobile phone 21, the mobile phone 21 only needs to perform interface interaction. For example, the WiFi module sends a product name to be searched so as to trigger a positioning and navigation request. In addition, it is also possible to receive and display positioning and navigation data through the WiFi module 22.

The wireless positioning unit 12, the camera unit 13, the direction finding unit 14, and the like may be mounted on the shopping cart 11. In addition, the shopping cart 11 may also be provided with a processor that controls each functional unit. The wireless positioning unit 12 may receive signals of wireless beacon nodes deployed in the environment using a Bluetooth positioning unit or a Zigbee positioning unit. The camera unit 13 may use a binocular or depth camera, and may be fixed to a front end of the shopping cart 11 obliquely upwards at an angle of 30° to 45°, so as to mainly capture an upper portion of the shelf and the ceiling in the scenario, and avoid collection of surrounding dynamic environment data as much as possible. The direction finding unit 14 may use a magnetometer or the like to determine a heading direction of the shopping cart 11 more accurately.

In some application examples, when the user uses the mobile phone 21 for product navigation or positioning of own current location, the positioning procedure is started by communicating with the positioning server 3. In an initial stage of the positioning procedure, the positioning server 3 may send a request to the processor of the shopping cart 11 so as to obtain a message of the wireless positioning coordinate. The processor of the shopping cart 11 may control the wireless positioning unit 12 to obtain the wireless positioning coordinate of the current shopping cart 11, and send a current image captured by the camera unit 13 and direction data measured by the direction finding unit 14 to the positioning server 3 together.

The positioning server 3 performs a visual positioning operation based on the data sent from one side of the shopping cart 11. If the visual positioning coordinate can be successfully obtained, the visual positioning coordinate is returned to the mobile phone 21 as a positioning result. If the visual positioning coordinate cannot be obtained due to various reasons, the coordinate of a projection point is obtained by way of projection on a path of the planar environment map, and the coordinate is returned to the mobile phone 21 as a positioning result.

If the mobile phone 21 needs the positioning server 3 to continuously provide positioning results so as to facilitate the real-time positioning or navigation functions, the positioning server 3 may determine whether the visual positioning coordinate is within a boundary range of the visual sub-map after obtaining the visual positioning coordinate of the current image. If the visual positioning coordinate is not within the boundary range, it means that there is a high possibility of the moving object not entering other visual sub-maps at the next moment. Correspondingly, a visual positioning operation of the image at the next moment may be performed based on the current visual sub-map.

If the visual positioning coordinate is already within a boundary range of the visual sub-map, it is indicated that there is a high possibility of the moving object entering other visual sub-maps. At this time, a visual sub-map at the next moment is predicted and a visual positioning operation of the image at the next moment is performed based on the visual sub-map at the next moment.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features may be made without departing from the scope and spirit of the present disclosure. The scope of the present disclosure is defined by the appended claims.

What is claimed is:

1. A positioning method, comprising:
   receiving a wireless positioning coordinate of a moving object;
   determining a visual sub-map to be matched in a visual map database based on the wireless positioning coordinate; and
   obtaining a visual positioning coordinate corresponding to a current image of the moving object captured at time of wireless positioning as a positioning result, based on the determined visual sub-map to be matched;
   wherein the positioning method further comprises:
   determining a projection point of the wireless positioning coordinate on a preset path as a positioning result, based on a planar environment map of a positioning coverage area;
   wherein determining a projection point comprises: determining whether a navigation path has been generated within the planar environment map; if so, projecting the wireless positioning coordinate onto the navigation path, and if not, projecting the wireless positioning coordinate onto an accessible path in the planar environment map;

wherein the positioning method further comprises: when the wireless positioning coordinate is projected onto the navigation path, determining whether the shortest distance of projecting the wireless positioning coordinate onto the navigation path is greater than an absolute value of a system error of the wireless positioning coordinate; if so, projecting the wireless positioning coordinate onto the accessible path, and if not, using a projection point corresponding to the shortest distance as a positioning result.

2. The positioning method according to claim 1, wherein determining the visual sub-map to be matched comprises:
selecting at least one of a visual sub-map where the wireless positioning coordinate is located and an adjacent visual sub-map, as the visual sub-map to be matched.

3. The positioning method according to claim 1, wherein determining the visual sub-map to be matched comprises:
drawing a geometric pattern with the wireless positioning coordinate as a reference point based on a system error of the wireless positioning coordinate, and determining a plurality of visual sub-maps pre-stored in the visual map database which are entirely or partly covered by the geometric pattern, as the visual sub-map to be matched.

4. The positioning method according to claim 1, wherein obtaining the visual positioning coordinate comprises:
determining a matching key frame in the visual sub-map to be matched that matches the current image; and
performing an iterative pose estimation on the current image and the matching key frame to obtain the visual positioning coordinate corresponding to the current image.

5. The positioning method according to claim 4, wherein determining a matching key frame comprises:
performing a feature extraction on the current image and obtaining corresponding visual words;
searching a candidate matching frame in key frames of the visual sub-map to be matched, wherein a matching score between at least one visual word of the candidate matching frame and visual words of the current image is greater than a first threshold;
counting an amount of visual words of each candidate matching frame, wherein a matching score between the visual words and the visual words of the current image is greater than a second threshold, and selecting a candidate matching frame with an amount greater than a third threshold as a common-view frame;
making each common-view frame and a preset number of key frames before or after the common-view frame into a group, and calculating an accumulative score of matching degree between visual words of all key frames in each group and the visual words of the current image; and
referring a key frame with the highest matching score in a group with the accumulative score of matching degree greater than a fourth threshold as the matching key frame.

6. The positioning method according to claim 1, further comprising a step of constructing a visual map database, which comprises:
registering coordinate systems of a wireless positioning process and a visual positioning process;
dividing a positioning coverage area into a plurality of visual sub-maps, and collecting sparse three-dimensional map feature points and visual words of a plurality of key frames within a range of each visual sub-map; and
saving the plurality of key frames corresponding to respective visual sub-maps, the sparse three-dimensional map feature points and the visual words to the visual map database.

7. The positioning method according to claim 1, further comprising:
predicting a visual sub-map to be entered by the moving object based on the visual positioning coordinate and a direction of the moving object when it is determined that the moving object is in a boundary area of a visual sub-map at a current moment based on the visual positioning coordinate; and
determining the predicted visual sub-map as the visual sub-map to be matched, and performing an operation of obtaining a visual positioning coordinate corresponding to a next image.

8. The positioning method according to claim 7, wherein predicting a visual sub-map comprises:
determining a straight line passing through the visual positioning coordinate and having the same direction as the moving object based on the visual positioning coordinate and a direction of the moving object; and
when there is an intersection between the straight line and a boundary of an adjacent visual sub-map of a visual sub-map at the current moment, and a distance between the visual positioning coordinate and the boundary is shorter than a distance between the visual positioning coordinate and other boundaries of the visual sub-map at the current moment, predicting that the adjacent visual sub-map is the visual sub-map to be entered by the moving object.

9. The positioning method according to claim 1, wherein an operation of projecting the wireless positioning coordinate onto the accessible path comprises:
determining an accessible path in the planar environment map with the smallest included angle relative to a direction of the moving object and at the closest distance to the wireless positioning coordinate; and
taking a projection point of projecting the wireless positioning coordinate onto the accessible path which has been determined as a positioning result.

10. A positioning server, comprising:
a memory; and
a processor coupled to the memory, wherein the processor is configured to perform the positioning method according to claim 1 based on instructions stored in the memory.

11. A positioning system, comprising:
the positioning server according to claim 10; and
moving object moving in a positioning coverage area, and configured to perform wireless communication with the positioning server.

12. The positioning system according to claim 11, further comprising:
a user interaction terminal configured to send and receive positioning messages, which communicates with the positioning server.

13. The positioning system according to claim 12, wherein the moving object comprising a shopping cart, and the user interaction terminal comprises a mobile phone of user.

14. A positioning method, comprising:
receiving a wireless positioning coordinate of a moving object;
determining a visual sub-map to be matched in a visual map database based on the wireless positioning coordinate; and
obtaining a visual positioning coordinate corresponding to a current image of the moving object captured at time of wireless positioning as a positioning result, based on the determined visual sub-map to be matched;
wherein the positioning method further comprises:
determining a projection point of the wireless positioning coordinate on a preset path as a positioning result, based on a planar environment map of a positioning coverage area;
wherein determining a projection point comprises: determining whether a navigation path has been generated within the planar environment map; if so, projecting the wireless positioning coordinate onto the navigation path, and if not, projecting the wireless positioning coordinate onto an accessible path in the planar environment map;
wherein an operation of projecting the wireless positioning coordinate onto the accessible path comprises: determining an accessible path in the planar environment map with the smallest included angle relative to a direction of the moving object and at the closest distance to the wireless positioning coordinate; and taking a projection point of projecting the wireless positioning coordinate onto the accessible path which has been determined as a positioning result.

15. The positioning method according to claim 14, wherein determining the visual sub-map to be matched comprises:
selecting at least one of a visual sub-map where the wireless positioning coordinate is located and an adjacent visual sub-map, as the visual sub-map to be matched; or
drawing a geometric pattern with the wireless positioning coordinate as a reference point based on a system error of the wireless positioning coordinate, and determining a plurality of visual sub-maps pre-stored in the visual map database which are entirely or partly covered by the geometric pattern, as the visual sub-map to be matched.

16. The positioning method according to claim 14, wherein obtaining the visual positioning coordinate comprises:
determining a matching key frame in the visual sub-map to be matched that matches the current image; and
performing an iterative pose estimation on the current image and the matching key frame to obtain the visual positioning coordinate corresponding to the current image.

17. The positioning method according to claim 14, further comprising a step of constructing a visual map database, which comprises:
registering coordinate systems of a wireless positioning process and a visual positioning process;
dividing a positioning coverage area into a plurality of visual sub-maps, and collecting sparse three-dimensional map feature points and visual words of a plurality of key frames within a range of each visual sub-map; and
saving the plurality of key frames corresponding to respective visual sub-maps, the sparse three-dimensional map feature points and the visual words to the visual map database.

18. The positioning method according to claim 14, further comprising:
predicting a visual sub-map to be entered by the moving object based on the visual positioning coordinate and a direction of the moving object when it is determined that the moving object is in a boundary area of a visual sub-map at a current moment based on the visual positioning coordinate; and
determining the predicted visual sub-map as the visual sub-map to be matched, and performing an operation of obtaining a visual positioning coordinate corresponding to a next image.

19. A positioning server, comprising:
a memory; and
a processor coupled to the memory, wherein the processor is configured to perform the positioning method according to claim 14 based on instructions stored in the memory.

20. A positioning system, comprising:
the positioning server according to claim 19; and
moving object moving in a positioning coverage area, and configured to perform wireless communication with the positioning server.

* * * * *